(12) United States Patent
Haugh

(10) Patent No.: US 7,231,666 B2
(45) Date of Patent: Jun. 12, 2007

(54) METHOD AND APPARATUS FOR PREVENTING BUFFER OVERFLOW SECURITY EXPLOITS

(75) Inventor: Julianne Frances Haugh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 10/177,839

(22) Filed: Jun. 20, 2002

(65) Prior Publication Data

US 2003/0237001 A1  Dec. 25, 2003

(51) Int. Cl.
*G06F 21/00* (2006.01)
(52) U.S. Cl. .................................... 726/22
(58) Field of Classification Search .............. 726/22, 726/23; 377/51
See application file for complete search history.

(56) References Cited

U.S. PATENT DOCUMENTS 5,974,414 A * 10/1999 Stanczak et al. ............. 707/6
5,991,881 A * 11/1999 Conklin et al. ............. 726/22
6,014,723 A *  1/2000 Tremblay et al. ............ 711/1
6,301,699 B1* 10/2001 Hollander et al. ......... 717/131
6,542,990 B1*  4/2003 Tremblay et al. ......... 712/227
6,832,302 B1* 12/2004 Fetzer et al. .............. 711/170

OTHER PUBLICATIONS

Cowan et al., "StackGuard: Automatic Adaptive Detection and Prevention of Buffer-Overflow Attacks", Jan. 1998, pp. 1-16, obtained from http://www.usenix.org/publications/library/proceedings/sec98/full_papers/cowan/cowan.pdf.*

* cited by examiner

*Primary Examiner*—Emmanuel L. Moise
*Assistant Examiner*—Jeffrey Popham
(74) *Attorney, Agent, or Firm*—Duke W. Yee; Diane R. Gerhardt; Lisa L. B. Yociss

(57) ABSTRACT

A method, apparatus, and computer instructions for managing a data buffer. Data for the data buffer is received. A security action is performed in response to detecting data for the data buffer having a size greater than a designated size.

26 Claims, 3 Drawing Sheets

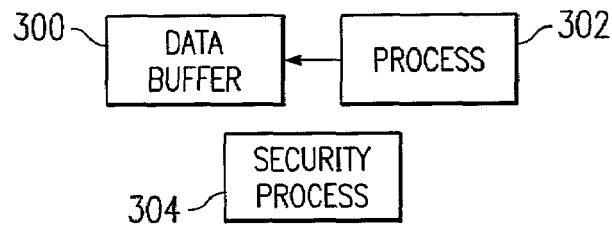
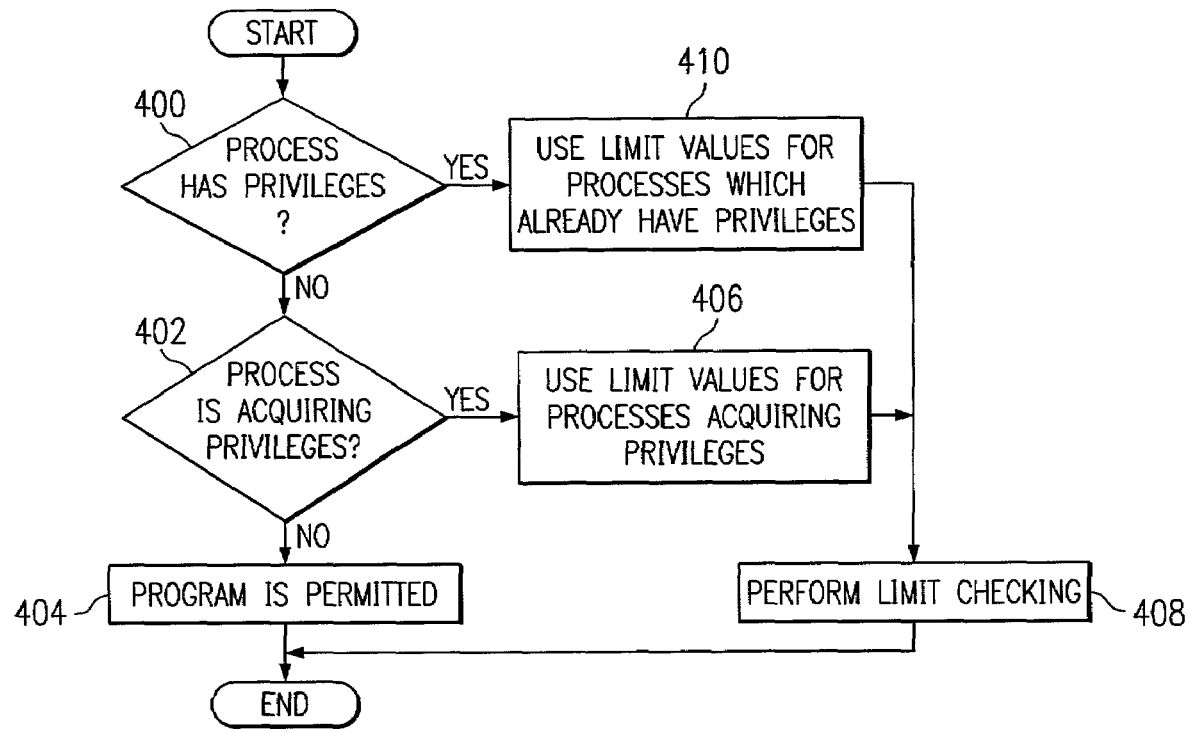

METHOD AND APPARATUS FOR PREVENTING BUFFER OVERFLOW SECURITY EXPLOITS

BACKGROUND OF THE INVENTION

1. Technical Field

The present invention relates generally to an improved data processing system, and in particular, to a method and apparatus for processing data. Still more particularly, the present invention provides a method and apparatus for preventing security exploits associated with buffer overflows.

2. Description of Related Art

Computers and networks are commonplace tools for many companies and businesses. Networks are used internally by a company to share information and conduct business. Often times, many types of applications and programs will be used within a network or a computer. Some of these applications and programs may be commercial packages while others may be customized for the particular client. These systems are often subject to attack or exploitation by unauthorized users.

For example, a hacker may attempt to gain unauthorized access to a computer system by trying to obtain a user ID and password that allows access to privileged objects within a system. Another area of concern involves security problems arising from coding errors that occur when a data buffer is allocated and data is copied into that buffer in a manner that the data "overflows" the end of the allocated storage. These types of overflows may allow an unauthorized or unprivileged subject to execute or access privileged objects in a computer or in a network.

For example, a command line argument may be added to a print command. If a buffer overflow is caused by the command line argument, a user may be able to print files that are normally unprintable by the particular user.

Another example of such a vulnerability is in Windows XP, which is an operating system available from Microsoft Corporation. With respect to universal plug and play (UPnP), an unchecked buffer is present in one of the components that handles NOTIFY directives, which are messages that advertise the availability of UPnP-capable devices on the network. By sending a specially-malformed NOTIFY directive, it would be possible for an attacker to cause code to run in the context of the UPnP service, which runs with system privileges on Windows XP. This situation would enable the attacker to gain complete control over the computer.

When these types of security holes or exploits are identified, programs may be patched to prevent future exploits. However, such a solution does not prevent buffer overflow exploits for programs and functions in which the bugs in coding that may allow unanticipated access remain unidentified.

Therefore, it would be advantageous to have an improved method, apparatus, and computer instructions for preventing security exploits based on buffer overruns.

SUMMARY OF THE INVENTION

The present invention provides a method, apparatus, and computer instructions for managing a data buffer. Data for the data buffer is received. A security action is performed in response to detecting data for the data buffer having a size greater than a designated size.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a diagram illustrating components used in preventing security exploits based on buffer overflows in accordance with a preferred embodiment of the present invention;

FIG. 4 is a flowchart of a process used for preventing buffer overflow security exploits in accordance with a preferred embodiment of the present invention.

DETAILED DESCRIPTION OF THE PREFERRED EMBODIMENT

Figure 1:
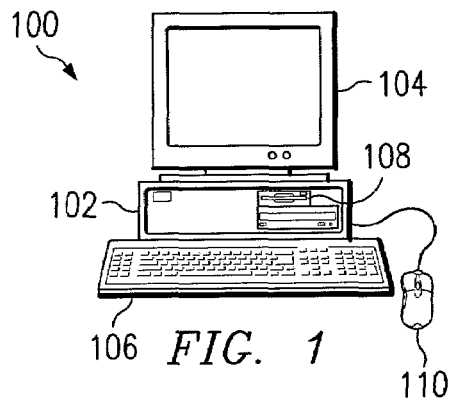
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
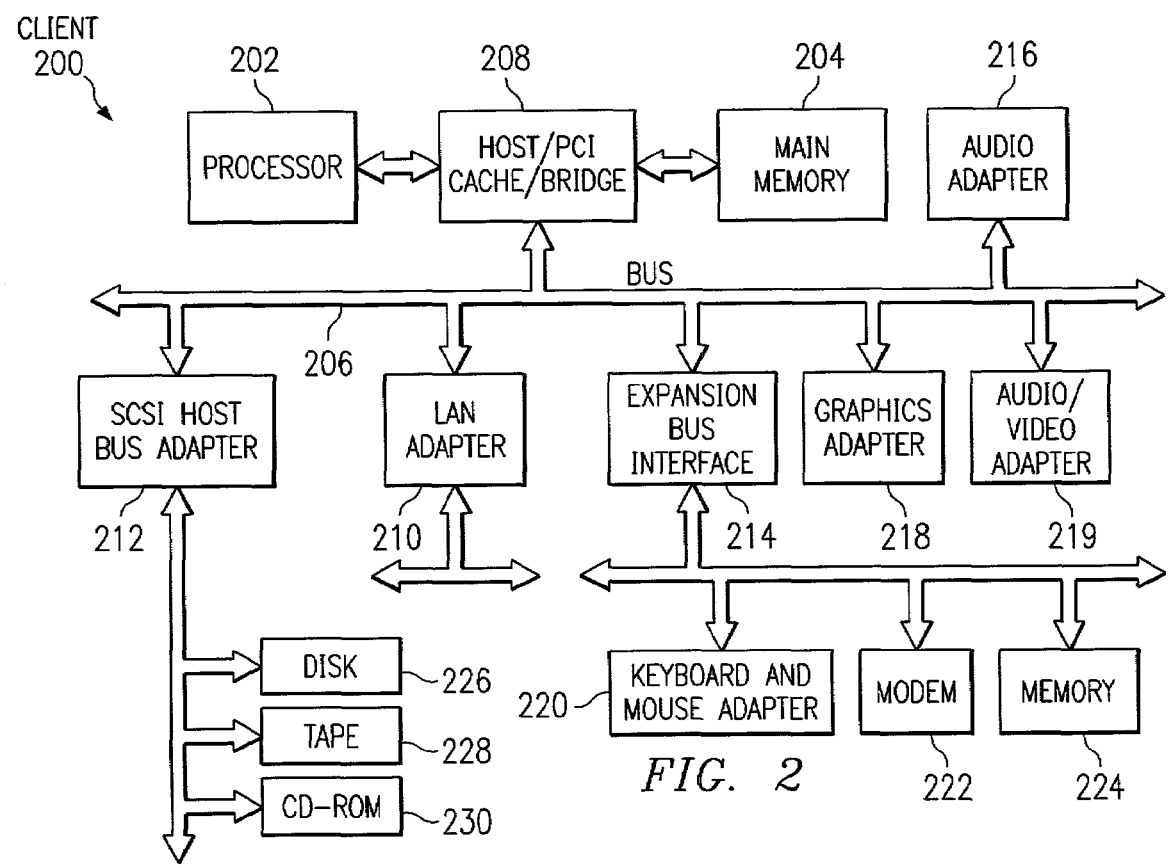
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards.

In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

Turning now to FIG. 3, a diagram illustrating components used in preventing security exploits based on buffer overflows is depicted in accordance with a preferred embodiment of the present invention. In this example, data buffer 300 is a location in which data may be copied into for executing functions and processes. Data is written into data buffer 300 by process 302 in this example. The mechanism of the present invention includes security process 304, which is designed to place limitations on the size of individual input parameters to prevent environmental variables and command line arguments from exceeding a selected size. Environmental variables are symbolic names used to provide information. For example, on UNIX-like operating systems, the HOME environmental variable contains the name of the current user's home directory. This environmental variable may be used by commands to determine where to store files which would normally be stored in the user's home directory. Another example is the NLSPATH environmental variable. This environmental variable is used to construct the name of the message files used by programs so that the program can produce messages in the appropriate language using the appropriate cultural conventions. Command line arguments are values passed with a command typed into a command line. These arguments are independent items, or variables, that contain data or codes.

Of course, the mechanism of the present invention may be implemented in other components, such as, for example, within the operating system or as an extension to the operating system such as systems, which provide an ability to load additional security policies. Depending on the size of the data placed into data buffer 300, security process 304 initiates a security action, which may include for example, preventing a program from acting on or using the data or logging a warning message. This message may contain information needed to identify the program or user initiating placement of the data into data buffer 300.

In these examples, an input into data buffer 300 are divided into two types, environmental variables and command line arguments. Further, two types of limitations are placed on the length of inputs in data buffer 300. For example, a soft limit is used to produce a warning message in the system error log for audit trail when this limit is exceeded when data is placed into data buffer 300. A hard limit also is used, which causes command execution to fail, when this limit is exceeded.

The mechanism of the present invention also may look to see what privileges are present. For example, execution of a privileged object by an unprivileged subject and execution of any object by a privileged subject are situations in which the mechanism of the present invention checks for buffer overflows. With respect to these two instances, these situations represent instances in which the privilege is enhanced, which is a more common scenario for violating security in a computer system or network. The situation in which an unprivileged object is executed by an unprivileged subject is not assumed to represent a security risk or exposure in these examples.

With reference now to FIG. 4, a flowchart of a process used for preventing buffer overflow security exploits is depicted in accordance with a preferred embodiment of the present invention. The process illustrated in FIG. 4 may be implemented in a security process, such as security process 304 in FIG. 3.

The process begins by making a determination as to whether the process has privileges (step 400). In these examples, a privilege allows a process to perform an operation that the process normally would not be permitted to perform absent the privilege. A privilege may be required to access objects or to perform operations. The objects accessed may be, for example, files, devices, and memory segments. The operations may be, for example, adding users, modifying an audit system, and configuring devices.

If the process does not have privileges, a determination is made as to whether the process is acquiring privileges (step 402). Printing of a document is an example of an operation of a process in which a process may acquire a privilege. A process which spools print requests must be able to write to the directory which contains print requests. An ordinary process lacks the privileges needed to perform this operation. The process temporarily acquires privilege while running the print command so that the print command may spool the print request. If the process is not acquiring privileges, the program is permitted (step 404) and the process terminates thereafter. This situation is one in which an unprivileged object is executed by an unprivileged subject or process and is assumed not to present a security risk or exposure.

With reference again to step 402, if the process is acquiring privileges, limit values for processes acquiring privileges are used (step 406). In these examples, a total of eight limits, which may be defined by a 2×2×2 matrix, are present. One dimension is an environmental variable or a command line argument, while another dimension is a privilege process or a privilege acquiring process. The third dimension is a soft limit or hard limit. In these examples, the soft limit causes a logging of the operation while the hard limit also results in a termination or prohibition of process execution. Of the eight limits total, four are selected based on already privileged versus privilege acquiring. Of those four limits, two are selected based on whether the system is checking environmental variables or command line arguments at that instant. Limit checking is performed (step 408) and the process terminates thereafter. With reference again to step 400, if the process has privileges, limit values for processes which already have privileges are used (step 410) and the process proceeds to step 408 as described above.

Figure 5:
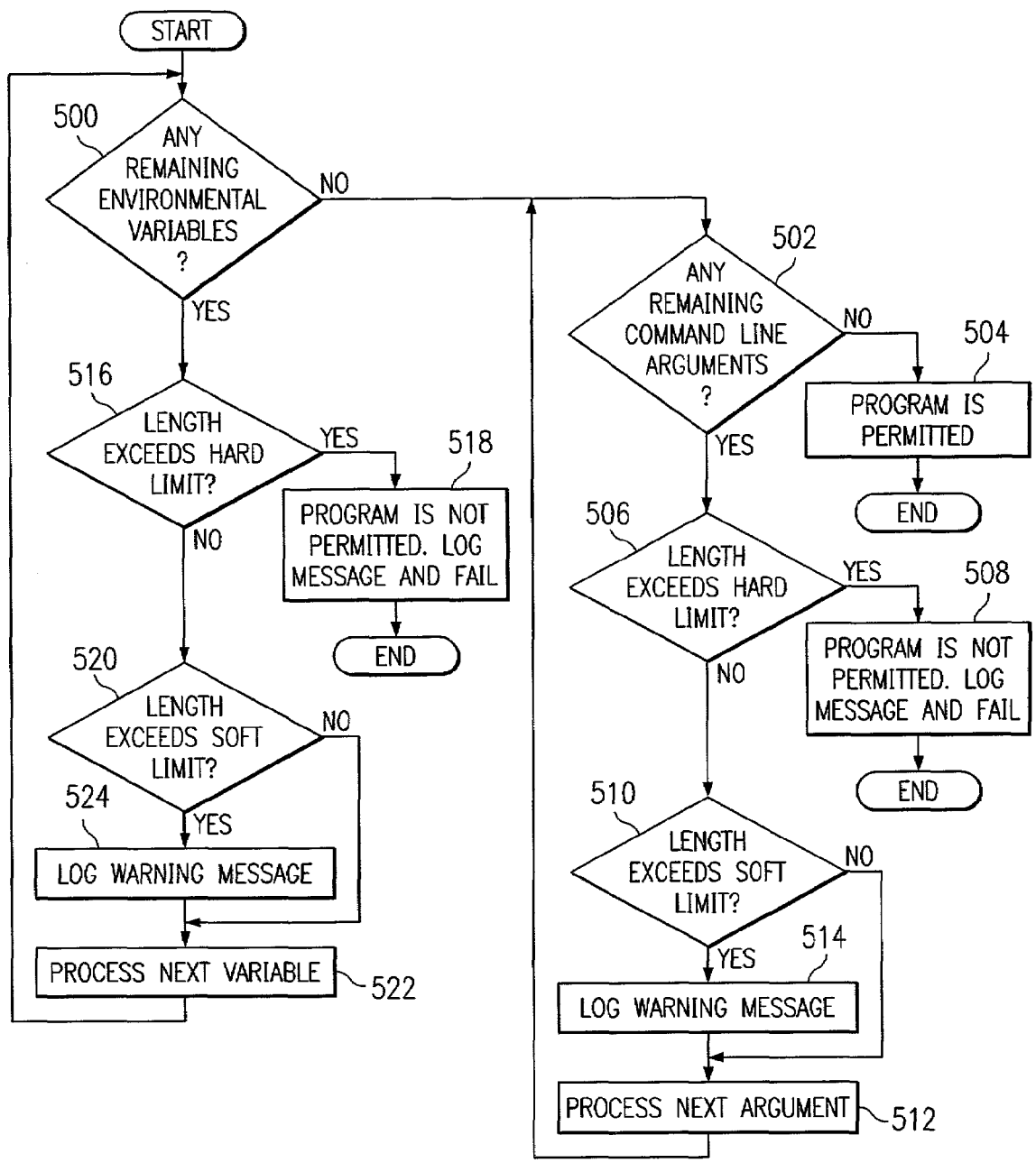
FIG. 5 is a flowchart of a process used for checking limits in accordance with a preferred embodiment of the present invention.

Turning now to FIG. 5, a flowchart of a process used for checking limits is depicted in accordance with a preferred embodiment of the present invention. The process illustrated in FIG. 5 is a more detailed description of step 408 in FIG. 4.

The process begins by making a determination as to whether any remaining environmental variables are present for processing (step 500). If more environmental variables are not present for processing, a determination is made as to whether any remaining command line arguments are present for processing (step 502). If more command line arguments are not present for processing, the program is permitted to proceed executing with the environmental variables or command line arguments placed in the buffer (step 504) and the process terminates thereafter.

With reference again to step 502, if more remaining command line arguments are present for processing, a determination is made as to whether the length of the command line argument being processed exceeds a hard limit (step 506). If the length does exceed the hard limit, the program is not permitted to continue execution, a message is logged and the program fails (step 508) with the process terminating thereafter.

The message may be stored in a log or other file for later use. In these examples, the message includes information about the object in which access was attempted and information about the process attempting the access. For example, the message may include the name of a file, a path to the file, and an identification of the process attempting the access. Further, this information also may include a user ID for the user logged in at the time the access attempt failed. Any other information useful for identifying the subject or process attempting to access the object may be included in the message. For example, information about the date and length of data placed in the buffer may be logged as well as a process ID, and connection information.

If the length does not exceed the hard limit, a determination is made as to whether the length exceeds the soft limit (step 510). If the length does not exceed the hard limit, the next unprocessed argument in the buffer is selected for processing (step 512) and the process returns to step 502 as described above. If the length does exceed the soft limit, a warning message is logged (step 514) and the proceeds to step 512 as described above. This warning message may include information similar to messages logged when program execution is not permitted.

With reference again to step 500, if more remaining environmental variables are present for processing, a determination is made as to whether the length of the environmental variable exceeds the hard limit (step 516). If the length does exceed the hard limit, the program is not permitted, the message is logged and the program fails (step 518) with the process terminating thereafter. If the length does not exceed the hard limit, a determination is made as to whether the length exceeds the soft limit (step 520). If the length does not exceeds the hard limit, the next variable is selected for processing (step 522) and the process returns to step 500, as described above, to determine whether another environmental variable was present and selected by step 522. If the length does exceed the soft limit, a warning message is logged (step 524) and the proceeds to step 522 as described above.

The particular limits selected for the hard limit and the soft limit depend on the particular implementation. For example, a soft limit for a user name may be 16 Kbytes while a hard limit is 20 Kbytes. Further, the hard limit for the environmental variable may differ from the hard limit for the command line argument. Further, the soft limits may differ between an environmental variable and a command line argument.

Thus, the present invention provides an improved method, apparatus, and computer instructions for preventing buffer overflow security exploits. When a potential security risk or exposure is present, the mechanism of the present invention checks to see whether data input into the buffer exceeds selected limits or thresholds. Depending on what thresholds are exceeded, a warning message may be logged or execution of the program may be prevented. In this manner, exploitation of unknown or undiscovered security holds or risks may be prevented.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing a data buffer, the method comprising:
   receiving data for the data buffer;
   storing the data in the data buffer;
   determining a length of the data;
   determining whether the length of the data exceeds a first length limit;
   responsive to determining that the length of the data exceeds the first length limit, performing a first security action;
   responsive to determining that the length of the data does not exceed the first length limit, determining whether the length of the data exceeds a second length limit; and
   responsive to determining that the length of the data exceeds the second length limit, performing a second security action.

2. The method of claim 1, wherein the first security action includes logging information about the data.

3. The method of claim 2, wherein the information includes a portion of the data.

4. The method of claim 2, wherein the information includes information sufficient to identify a subject sending the data.

5. The method of claim 2, wherein the second security action includes preventing use of the data.

6. The method of claim 1, wherein the data includes at least one of environmental variables and command line arguments.

7. The method of claim 1, wherein the data is received from a process and wherein the performing steps are initiated only if the process has privileges or is acquiring privileges in the data processing system.

8. The method of claim 1 wherein the step of performing a second security action includes generating a warning and wherein the step of performing a first security action includes failing command execution on the data.

9. A method in a data processing system for preventing security exploits, the method comprising:
   identifying data for a buffer;
   storing the data in the buffer;
   determining a length of the data;
   determining whether the length of the data exceeds a first length limit;
   responsive to determining that the length of the data exceeds the first length limit, denying a process, which is trying to access the data in the buffer, permission to execute an action on the data;
   responsive to determining that the length of the data does not exceed the first length limit, determining whether the length of the data exceeds a second length limit; and
   responsive to determining that the length of the data exceeds the second length limit but does not exceed the first length limit, generating a warning.

10. The method of claim 9 further comprising:
    initiating the determining steps if a process placing data in the buffer is an unprivileged process accessing a privileged object; and
    initiating the determining steps if the process is a privileged process accessing any object.

11. The method of claim 9, further comprising:
    determining whether the data is an environmental variable or a command line argument;
    responsive to determining that the data is an environment variable;
      determining whether the length of the data exceeds a first environmental length limit;
      responsive to determining that the length of the data exceeds the first environment length limit, denying a process, which is trying to access the data in the buffer, permission to execute an action on the data;
      responsive to determining that the length of the data does not exceed the first environmental length limit, determining whether the length of the data exceeds a second environmental length limit;
      responsive to determining that the length of the data exceeds the second environmental length limit but does not exceed the first environmental length limit, generating a warning;
    responsive to determining that the data is a command line argument:
      determining whether the length of the data exceeds a first command line argument length limit;
      responsive to determining that the length of the data exceeds the first command line argument length limit, denying a process, which is trying to access the data in the buffer, permission to execute an action on the data;
      responsive to determining that the length of the data does not exceed the first command line argument length limit, determining whether the length of the data exceeds a second command line argument length limit; and
      responsive to determining that the length of the data exceeds the second command line argument length limit but does not exceed the first command line argument length limit, generating a warning.

12. A data processing system for managing a data buffer, the data processing system comprising:
    a bus system;
    a communications unit connected to the bus system;
    a memory connected to the bus system, wherein the memory includes a set of instructions; and
    a processing unit connected to the bus system, wherein the processing unit executes the set of instructions to receive data for the data buffer; store the data in the data buffer; determine a length of the data, determine whether the length of the data exceeds a first length limit; perform a first security action in response to determining that the length of the data exceeds the first length limit, determine whether the length of the data exceeds a second length limit in response to determining that the length of the data does not exceed the first length limit; and perform a second security action in response to determining that the length of the data exceeds the second length limit.

13. A data processing system for preventing security exploits, the data processing system comprising:
    a bus system;
    a communications unit connected to the bus system;
    a memory connected to the bus system, wherein the memory includes a set of instructions; and
    a processing unit connected to the bus system, wherein the processing unit executes the set of instructions to identify data for a buffer; store the data in the buffer; determine a length of the data, determine whether the length of the data exceeds a first length limit; deny a process, which is trying to access the data in the buffer, permission to execute an action on the data in response to determining that the length of the data exceeds a first length limit; responsive to determining that the length of the data does not exceed the first length limit, determine whether the length of the data exceeds a second length limit; generate a warning in response to determining that the length of the data exceeds the second length limit but does not exceed the first length limit.

14. A data processing system for managing a data buffer, the data processing system comprising:
receiving means for receiving data for the data buffer;
storing means for storing the data in the data buffer;
determining means for determining the length of the data;
second determining means for determining whether the length of the data exceeds a first length limit;
first performing means, responsive to determining that the length of the data exceeds the first length limit, for performing a first security action;
third determining means, responsive to determining that the length of the data does not exceed the first length limit, for determining whether the length of the data exceeds a second length limit; and
second performing means, responsive to determining that the length of the data exceeds the second length limit, performing a second security action.

15. The data processing system of claim 14, wherein the first security action includes logging information about the data.

16. The data processing system of claim 15, wherein the information includes a portion of the data.

17. The data processing system of claim 15, wherein the information includes information sufficient to identify a subject sending the data.

18. The data processing system of claim 15, wherein the second security action includes preventing use of the data.

19. The data processing system of claim 14, wherein the data includes at least one of environmental variables and command line arguments.

20. The data processing system of claim 14, wherein the data is received from a process and wherein the first and second performing means are initiated only if the process has privileges or is acquiring privileges in the data processing system.

21. The data processing system of claim 14 wherein the second performing means generates a warning and the first performing means causes command execution on the data to fail.

22. A data processing system for preventing security exploits, the data processing system comprising:
identifying means for identifying data for a buffer;
storing means for storing the data in the buffer;
first determining means for determining a length of the data;
second determining means for determining whether the length of the data exceeds a first length limit;
denying means, responsive to determining that the length of the data exceeds a first length limit, for denying a process, which is trying to access the data in the buffer, permission to execute an action on the data;
third determining means, responsive to determining that the length of the data does not exceed the first length limit, for determining whether the length of the data exceeds a second length limit; and
generating means, responsive to determining that the length of the data exceeds a second length limit and does not exceed the first length limit, for generating a warning.

23. The data processing system of claim 22 further comprising:
first initiating means for executing the second determining means and the third determining means if a process placing data in the buffer is an unprivileged process accessing a privileged object; and
second initiating means for executing the second determining means and the third determining means if the process is a privileged process accessing any object.

24. The data processing system of claim 22, wherein the data includes at least one of an environmental variable and a command line argument.

25. A computer program product that is stored in a computer readable medium and executing on a processor for managing a data buffer, the computer program product comprising:
first instructions for receiving data for the data buffer;
second instructions for storing the data in the data buffer;
third instructions for determining the length of the data;
fourth instructions for determining whether the length of the data exceeds a first length limit;
fifth instructions, responsive to determining that the length of the data exceeds the first length limit, for performing a first security action;
sixth instructions, responsive to determining that the length of the data does not exceed the first length limit, for determining whether the length of the data exceeds a second length limit; and
seventh instructions, responsive to determining that the length of the data exceeds the second length limit, for performing a second security action.

26. A computer program product that is stored in a computer readable medium and executing on a processor for preventing security exploits, the computer program product comprising:
first instructions for identifying data for a buffer;
second instructions for storing the data in the buffer;
third instructions for determining a length of the data;
fourth instructions for determining whether the length of the data exceeds a first length limit;
fifth instructions responsive to determining that the length of the data exceeds the first length limit, for denying a process, which is trying to access the data in the buffer, permission to execute an action on the data;
sixth instructions responsive to determining that the length of the data does not exceed the first length limit, for determining whether the length of the data exceeds a second length limit; and
seventh instructions responsive to determining that the length of the data exceeds the second length limit but does not exceed the first length limit, for generating a warning.

* * * * *